United States Patent [19]
Yamamoto

[11] Patent Number: 5,848,240
[45] Date of Patent: *Dec. 8, 1998

[54] METHOD OF CONNECTING A FIRST TERMINAL TO PERIPHERAL EQUIPMENT CONNECTED TO A SECOND TERMINAL

[75] Inventor: Mitsuru Yamamoto, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 573,535

[22] Filed: Dec. 15, 1995

Related U.S. Application Data

[62] Division of Ser. No. 476,281, Jun. 7, 1995, Pat. No. 5,515,512, which is a continuation of Ser. No. 296,973, Aug. 26, 1994, abandoned, which is a continuation of Ser. No. 634,685, Dec. 27, 1990, abandoned.

[30] Foreign Application Priority Data

| Dec. 28, 1989 | [JP] | Japan | 1-338313 |
| Jan. 9, 1990 | [JP] | Japan | 2-001004 |

[51] Int. Cl.$^6$ .................................................. G06F 13/00
[52] U.S. Cl. .................................................. 395/200.43
[58] Field of Search ........................ 364/200; 379/61; 395/725, 325, 250, 800, 311, 280, 427, 848, 858, 872, 200.42, 200.43, 200.47, 200.56, 200.57

[56] References Cited

U.S. PATENT DOCUMENTS

| 4,112,490 | 9/1978 | Pohlman et al. | 364/200 |
| 4,237,534 | 12/1980 | Felix | 364/200 |
| 4,454,575 | 6/1984 | Bushaw et al. | 364/200 |
| 4,463,417 | 7/1984 | Bushaw et al. | 364/200 |
| 4,476,522 | 10/1984 | Bushaw et al. | 711/153 |
| 4,484,270 | 11/1984 | Quernemoen et al. | 364/200 |
| 4,599,611 | 7/1986 | Bowker et al. | 340/721 |
| 4,608,663 | 8/1986 | Gordon | 395/866 |
| 4,855,813 | 8/1989 | Russell et al. | 358/22 |
| 4,970,723 | 11/1990 | Lin | 370/359 |
| 5,115,499 | 5/1992 | Stiffer et al. | 711/148 |
| 5,119,367 | 6/1992 | Kawakatsu et al. | 370/54 |
| 5,119,370 | 6/1992 | Terry | 370/354 |
| 5,123,089 | 6/1992 | Belinski et al. | 395/200 |

FOREIGN PATENT DOCUMENTS

| 0039203 | 11/1981 | European Pat. Off. . |
| 0-110691 | 6/1984 | European Pat. Off. . |
| 58-58631 | 4/1983 | Japan . |

OTHER PUBLICATIONS

"SOMIW–A Multimedia Workstation with Real Time Capabilities in a Public Network (ISDN)" IEEE Global Tel. Conf., vol. 1, Dec. 1, 1986, pp. 479–483, Sciarappa.

Pat. Abs. Jp., vol. 014089 (E891) Feb. 19, 1990 (JP–A–129850) M. Schwartz, Telecommunication Networks: Protocols. Modeling and Analysis Addison Wesley, 1987 pp. 13–18.

*Primary Examiner*—Moustafa M. Meky
*Attorney, Agent, or Firm*—Fitzpatrick, Cella, Harper & Scinto

[57] ABSTRACT

A multi-media terminal apparatus controls switches to perform communications, so that processing units of its own terminal which controls various multi-media processing functions are connected to other multi-media terminal apparatuses via a transmission line having a plurality of channels in accordance with connection request instructions, or this connection state and connections among the processing units are simultaneously attained.

8 Claims, 9 Drawing Sheets

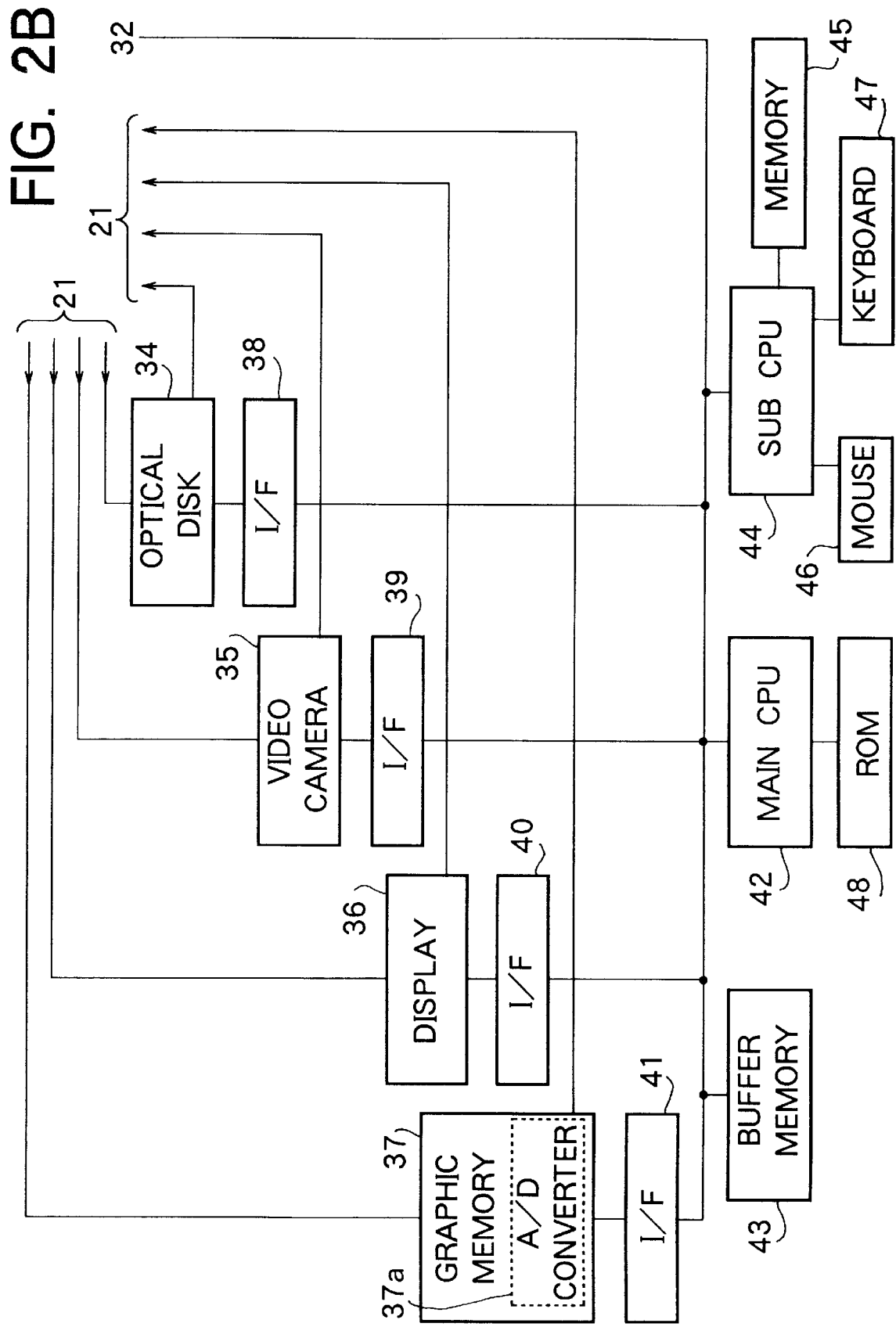

METHOD OF CONNECTING A FIRST TERMINAL TO PERIPHERAL EQUIPMENT CONNECTED TO A SECOND TERMINAL

This application is a division of application Ser. No. 08/476,281 filed Jun. 7, 1995, now U.S. Pat. No. 5,515,512 which is a continuation of application Ser. No. 08/296,973 filed Aug. 26, 1994, now abandoned, which is a continuation of application Ser. No. 07/634,685 filed Dec. 27, 1990, now abandoned.

BACKGROUND OF THE INVENTION

1. Field of the Invention

The present invention relates to a multi-media terminal apparatus which is connected to other multi-media terminal apparatuses via a transmission line capable of transmitting a plurality of channels, and comprises a plurality of multi-media processing functions.

2. Description of the Prior Art

Conventionally, various multi-media terminal apparatuses for editing and processing various media such as characters, numerals, figures, images, voices, and the like have been developed.

When these conventional multi-media terminal apparatuses are utilized, various peripheral equipments such as a scanner or a television camera for inputting an image, a display or a printer for outputting media, and an optical disk apparatus for recording/reproducing media information, and the like are connected to the terminal apparatuses, and can be used simultaneously.

FIG. 7 shows a conventional system configuration in which a plurality of multi-media terminal apparatuses 90 and 91, an optical disk 92, a television camera 93, a printer 94, and the like are connected via a network 95 so as to share various peripheral equipments, and to share. generated multi-media information.

FIG. 8 shows a conventional configuration wherein multi-media terminal apparatuses 130 and 131 to which peripheral equipments such as optical disks 133 and 135, a television camera 132, a printer 134, and the like are. connected via a network 98.

However, in these prior arts, of various media processed by the multi-media terminal apparatuses, image information particularly has a large information volume. When image information is transmitted through a network, a time required for transmission is prolonged. For this reason, in the configuration shown in FIG. 7, while at least one multi-media terminal apparatus on the network operates the peripheral equipments to input/output or record image information, and utilizes the network, another multi-media terminal apparatus must wait for a long period of time until the network becomes ready to use even if it wants to utilize a non-operating peripheral equipment. More specifically, a plurality of peripheral equipments on the network cannot be simultaneously operated.

In the configuration shown in FIG. 8, when a given multi-media terminal equipment utilizes various peripheral equipments connected thereto, the above-mentioned problem is not posed since they are utilized without going through the network. However, when the given multi-media terminal apparatus wants to utilize a peripheral equipment connected to another multi-media terminal apparatus via the network, a load associated with various data transmission operations is applied to a processing circuit in a multi-media terminal apparatus to which a target peripheral equipment is connected, and considerably influences processing originally executed by the multi-media terminal apparatus. Thus, the processing itself may be undesirably delayed or interrupted.

SUMMARY OF THE INVENTION

The present invention has been made to eliminate the above-mentioned drawbacks of the prior arts, and has the object to provide a multi-media terminal apparatus which can simultaneously operate a plurality of peripheral equipments connected to other multi-media terminal apparatuses on a network.

It is another object of the present invention to provide a multi-media terminal apparatus in which peripheral equipments do not influence processing of multi-media terminal apparatuses connected thereto.

In order to achieve the above objects, a multi-media terminal apparatus according to the present invention, is connected to other multi-media terminal apparatuses via a transmission line having a plurality of channels, and comprises a plurality of processing units for controlling various multi-media processing operations, communication control means for controlling communications with other multi-media terminal apparatuses connected to the transmission line through the plurality of channels, encoding/decoding means for encoding or decoding signals ransmitted/received by the communication control means, connection switching means for allowing connections among the communication control means and appropriate units of the plurality of processing units, instruction input means for inputting an instruction from an operator, detection means for detecting the instruction from the instruction input means and an instruction from another multi-media terminal apparatus received through a first channel consisting of at least one of the plurality of channels, and switching control means for controlling the connection switching means on the basis of the instructions detected by the detection means.

In accordance with a preferred embodiment of the present invention, the communication control means controls data communications among another multi-media terminal apparatus and the plurality of processing units via channels other than the first channel.

In accordance with another aspect of a preferred embodiment of the present invention, the connection switching means allows connections among the plurality of processing units while the communication control means controls data communications among another multi-media terminal apparatus and the plurality of processing units.

In accordance with still another aspect of a preferred embodiment of the present invention, the communication control means has signal control means for separating or combining a control signal and data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

An embodiment of the present invention will be described below with reference to the accompanying drawings.

Figure 1:
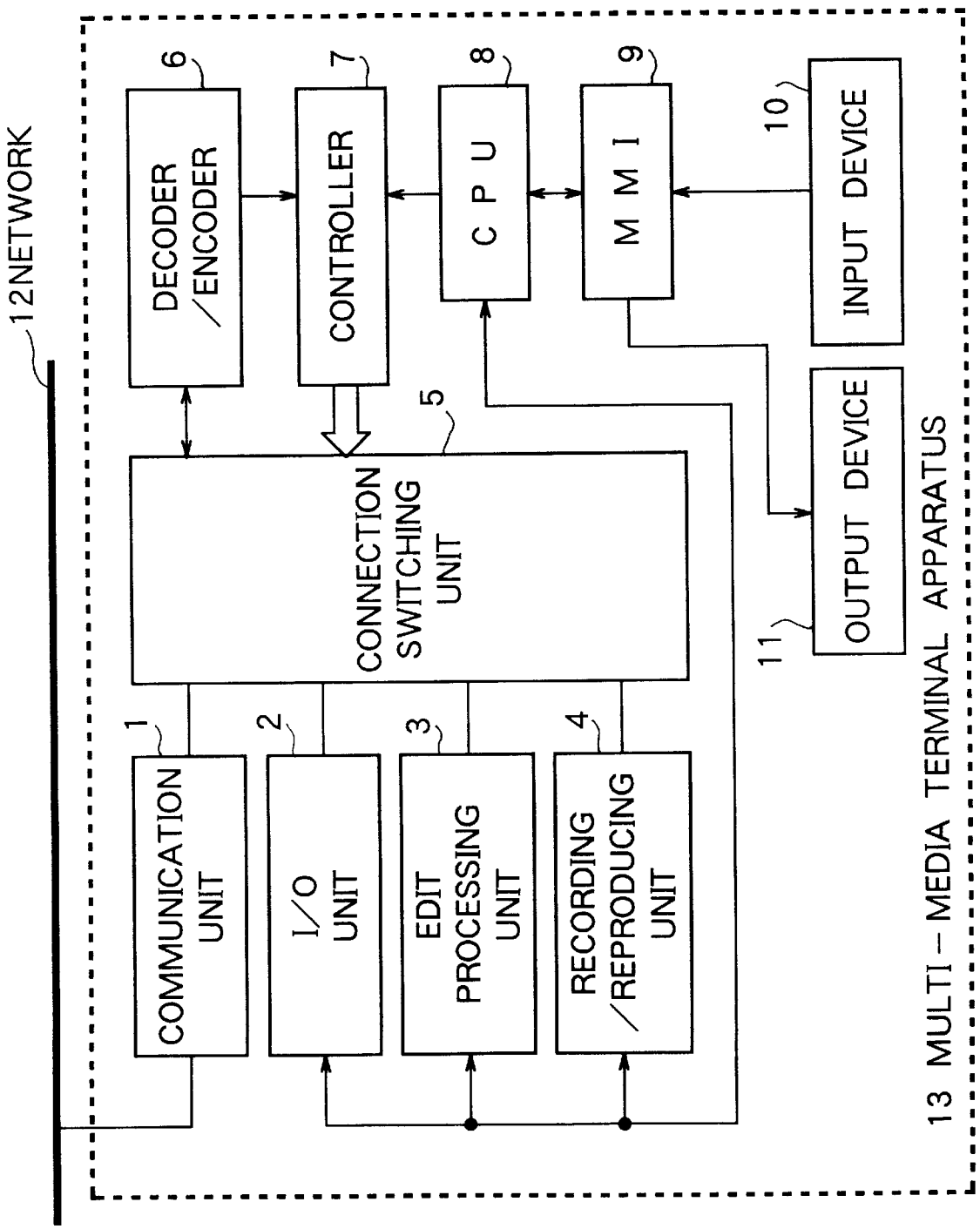
FIG. 1 is a block diagram of a multi-media terminal apparatus according to an embodiment of the present invention.

FIG. 1 is a block diagram of a multi-media terminal apparatus according to an embodiment of the present invention.

In FIG. 1, a communication unit 1 has a function of mutually converting electrical characteristics such as voltage levels, modulation methods, and the like of signals of a plurality of channels transmitted on a network 12, and signal voltage levels, modulation methods, and the like processed in a multi-media terminal apparatus 13. An input/output (I/O) unit 2 can receive peripheral equipments for inputting/outputting image data, voice data, and the like. An edit processing unit 3 performs edit processing of various media such as character data, numeric data, figure data, voice data, and the like. A recording/reproducing unit 4 records or reproduces various media information such as character data, numeric data, figure data, voice data, and the like.

Reference numeral 5 denotes a connection switching unit for allowing arbitrary connections among the communication unit 1, the I/O unit 2, the edit processing unit 3, the recording/reproducing unit 4, and a decoder/encoder unit 6. When there are no connection requests from other terminal apparatuses on the network 12, the unit 5 connects the communication unit 1 and the decoder/encoder unit 6. The decoder/encoder unit 6 has a function of detecting whether or not signals sent from other apparatuses on the network are connection requests to its own terminal, and a function of generating connection request signals to other apparatuses on the network.

A CPU 8 controls the overall apparatus according to this embodiment, and has a function of performing I/O operations between input and output devices 10 and 11 via a man-machine interface unit (MMI) 9 to establish better understanding between an operator and the terminal apparatus, and a function of transmitting connection requests of the peripheral equipments 2 to 4 originated by the operator to a controller 7, and at the same time, controlling the peripheral equipments 2 to 4. The controller 7 has a function of judging connection requests from other apparatuses on the network detected by the decoder/encoder unit 6, operator's connection requests obtained through the CPU 8, and the current connection states, and switching connection states of the connection switching unit 5.

Note that the multi-media terminal apparatus 13 according to this embodiment shown in FIG. 1 is not constituted by physically integrating all the constituting elements including the peripheral equipments 2 to 4, but it can be seen from other terminal apparatuses on the network as if they were logically integrated by the switching function of the connection switching unit 5 under the control of the controller 7.

With the above arrangement, the I/O unit 2, the edit processing unit 3, and the recording/reproducing unit 4 as the various peripheral equipments are arbitrarily connected through the connection switching unit 5 to perform data transmission, and can directly perform data transmission with other multi-media terminal apparatuses and various other peripheral equipments on the network 12 via the communication unit 1.

Figure 2A:
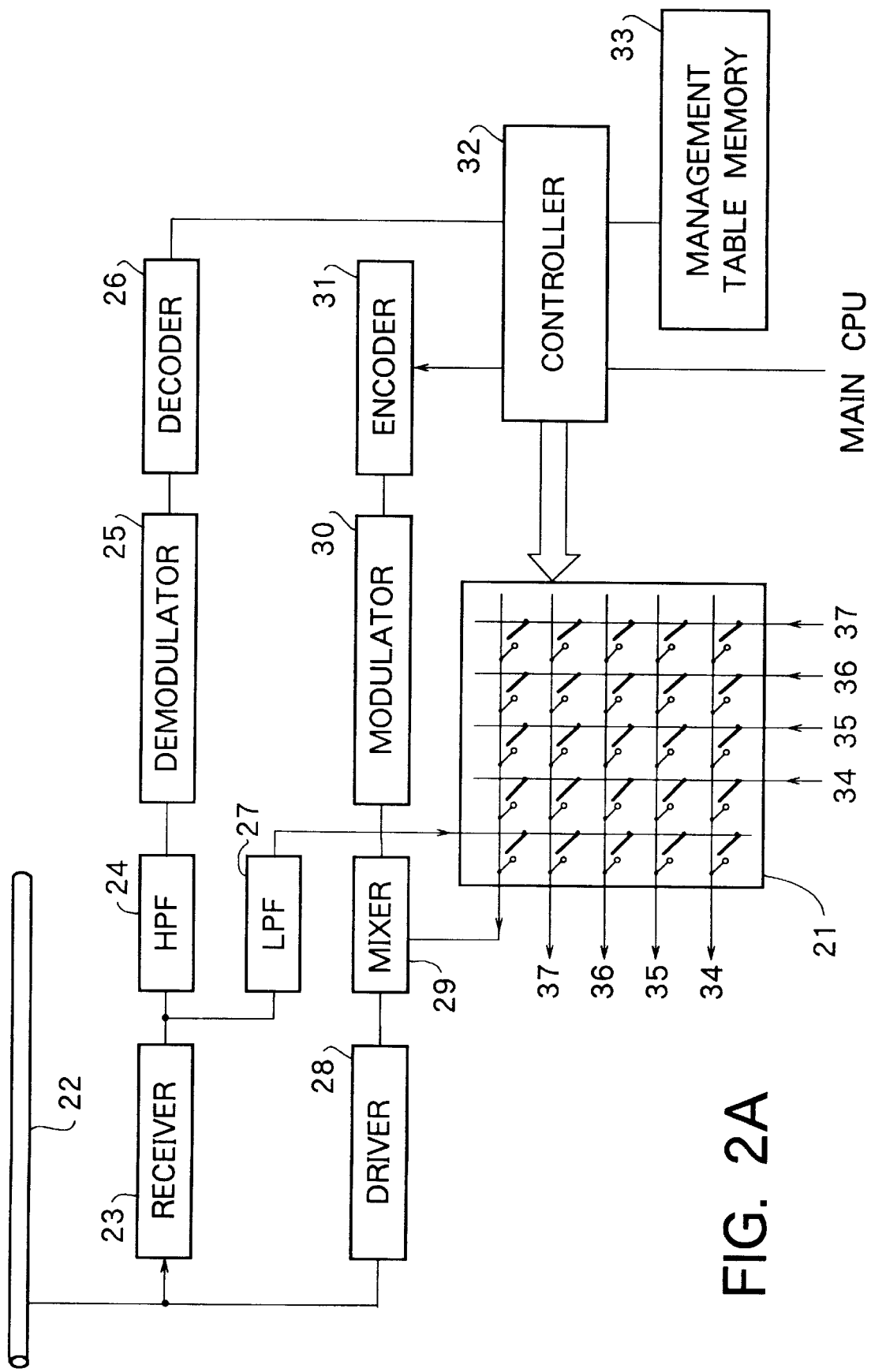
FIG. 2, comprised of FIGS. 2A and 2B, is a block diagram showing a detailed arrangement of the multi-media terminal apparatus according to the embodiment of the present invention.

FIG. 2 comprised of FIGS. 2A and 2B, is a block diagram showing a detailed arrangement of the multi-media terminal apparatus according to the embodiment of the present invention shown in FIG. 1.

In FIGS. 2A and 2B reference numeral 21 denotes cross-point switches; and a network 22 is a coaxial cable for transmitting a baseband signal having a bandwidth of 6 MHz, and a control signal having a bandwidth of 1 MHz and modulated to 10 MHz. The baseband signal is used to transmit data among various peripheral equipments, and the control signal is used to switch connections among the cross-point switches, and to control various peripheral equipments.

Reference numeral 23 denotes a receiver for receiving signals from the network 22; 24, a high-pass filter (HPF) for selectively allowing to pass the control signal therethrough; numeral 25, a demodulator for demodulating the control signal; and numeral 26, a decoder for decoding the control signal and supplying a decoding result to a controller 32.

Reference numeral 27 denotes a low-pass filter (LPF) for selectively supplying the baseband signal to the cross-point switches 21. Reference numeral 32 denotes the controller for controlling connections among various peripheral equipments (34 to 37) connected to the cross-point switches 21 and connections among the peripheral equipments and the network 22 by performing ON/OFF operations of respective contacts of the cross-point switches 21. Reference numeral 33 denotes a management table memory for storing connection states of the contacts of the cross-point switches 21 and operating states of the peripheral equipments.

Reference numeral 35 denotes a video camera for inputting image data; 36, a display for displaying an image; and 34, an optical disk for recording/reproducing image data. These peripheral equipments are connected to a main CPU 42 via corresponding interfaces (I/Fs) 38 to 41. A graphic memory 37 inputs or outputs an image signal via its internal A/D converter 37a, and is connected to the main CPU 42 via an I/F 41 to edit or process fetched image data.

The main CPU 42 controls the overall apparatus and executes various processing operations in accordance with a program stored in a ROM 48. Reference numeral 43 denotes a buffer memory for temporarily storing various data, and for storing and processing control data for the main CPU 42. Reference numeral 44 denotes a sub CPU for analyzing contents of operator's instructions issued by using a keyboard 47 or a mouse 46, and supplying analysis results to the main CPU 42.

The operation of the cross-point switches 21 mentioned above will be briefly described below.

Figure 3A:
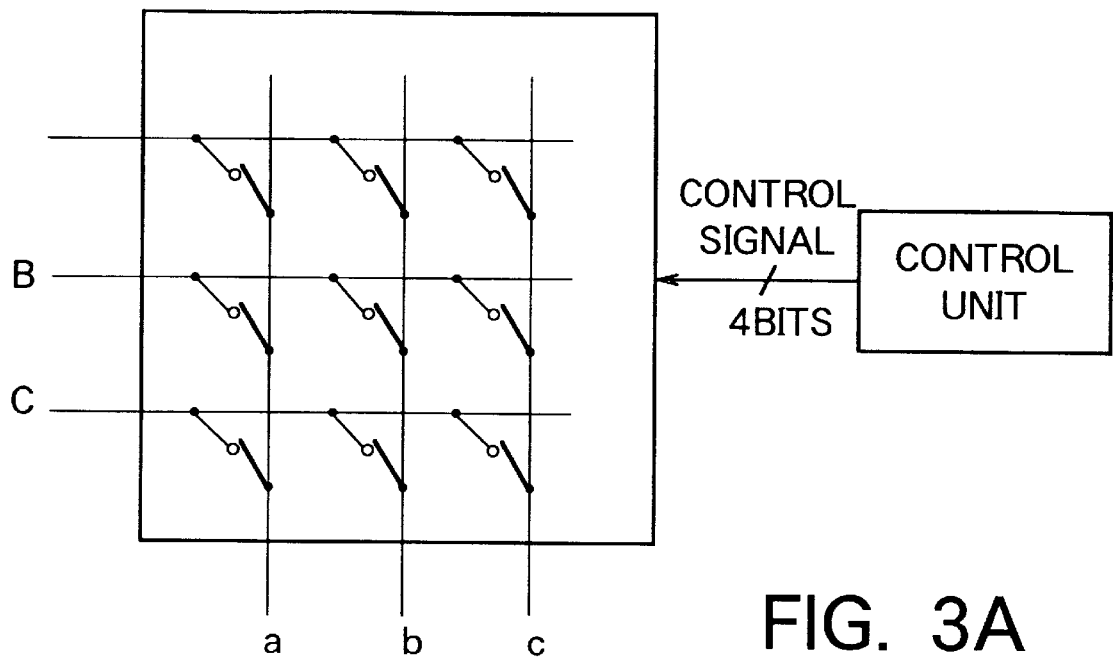
FIGS. 3A and 3B are views for explaining operations of cross-point switches according to the embodiment shown in FIG. 1.

FIG. 3A shows 3×3 cross-point switches. In FIG. 3A, switches are arranged on intersections of horizontal signal lines A, B, and C, and vertical signal lines a, b, and c. ON/OFF operations of these switches are controlled by a control signal from a control unit (in this case, 4-bit signal lines are required for nine switches), so that connections of signal lines A, B, and C, and the signal lines a, b, and c can appropriately be made.

Figure 3B:
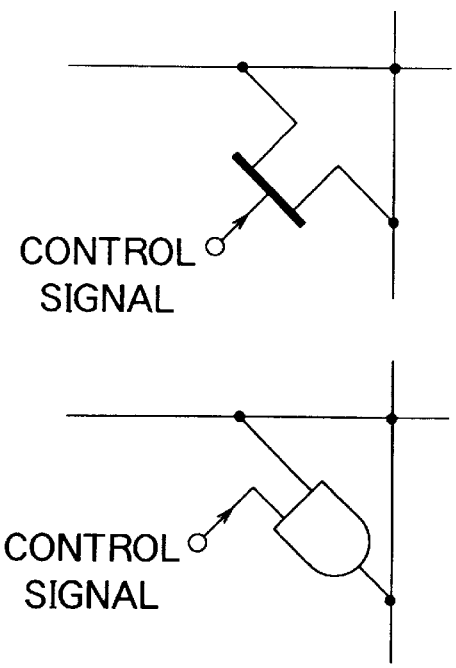

As shown in FIG. 3B, each switch element often comprises an analog switch such as an FET. If gate elements are used in place of analog switches, cross-point switches for digital signals can be obtained.

The operation of the multi-media terminal apparatus according to this embodiment with the arrangement mentioned above will be described below.

In FIG. 2A, the receiver 23 receives signals of a plurality of channels sent from other multi-media terminal apparatuses on the network 22. Of the received signals of the plurality of channels, the HPF 24 extracts only a control signal portion modulated by 10 MHz. This control signal is demodulated by the demodulator 25, and the demodulated signal is decoded by the decoder 26.

The decoded control signal is supplied to the main CPU 42 via the controller 32 to detect whether or not a connection request to its own terminal is issued. At the same time, the main CPU 42 detects start and end states of communications among other multi-media terminal apparatuses to determine the operational status of the channels, and records the detection results in the management table memory 33.

Of the signals of the plurality of channels, the LPF 27 extracts a baseband signal. The baseband signal is input to the cross-point switches 21. This signal is sent to the various peripheral equipments in accordance with an instruction of the control signal, and is received by the corresponding equipments.

A case where an operator issues an instruction using the keyboard 47 or the mouse 46 to display an image signal from the optical disk 34 on the display 36, will be explained below.

When the operator issues an instruction using the keyboard 47 or the mouse 46 to display an image signal from the optical disk 34 on the display 36, the sub CPU 44 decodes this instruction, and supplies the decoding result to the main CPU 42. The main CPU 42 issues a request signal to the controller 32 so that the cross-point switches 21 operate to connect the display 36 and the optical disk 34. In response to this request signal, the controller 32 looks up the management table memory 33 to confirm that the optical disk 34 and the display 36 are not connected to other peripheral equipments, i.e., they are in no-operation. The controller 32 sends back a response signal to the main CPU 42, and sets the ON/OFF of the cross-point switches 21 to desired states. Upon reception of the response signal, the main CPU 42 starts the operations of corresponding optical disk 34 and the display 36 via the I/Fs 38 and 40.

A case where a connection request for the video camera 35 is generated from another terminal apparatus on the network 22 while the image signal from the optical disk 34 is being reproduced on the display 36, will be explained below.

When a connection with another multi-media terminal apparatus on the network 22 is to be requested, the main CPU 42 supplies an apparatus number of a target multi-media terminal apparatus, and an equipment number of a target peripheral equipment. The controller 32 looks up the management table memory 33 to confirm an available baseband channel. The controller 32 generates a terminal connection request signal by adding its own terminal number to the information from the main CPU 42, and sends this signal to an encoder 31. The terminal connection request signal is encoded by the encoder 31, and is modulated by a modulator 30. The modulated signal is transmitted onto the network 22 via a mixer 29 and a driver 28.

On the other hand, in a multi-media terminal apparatus which receives the connection request, the terminal connection request signal sent onto the network 22 as described above is received by the receiver 23. The received signal is demodulated by the demodulator 25 via the HPF 24, and the demodulated signal is decoded by the decoder 26, thereby confirming that the received signal is a connection request to its own terminal. The decoder 26 also decodes the peripheral equipment number, and supplies the decoding result to the controller 32.

The controller 32 searches a connection condition of a peripheral equipment requested to be connected (in this case, the video camera 35) by looking up the management table memory 33, and confirms that the equipment is ready. Thereafter, the controller 32 rewrites items corresponding to the video camera 35 and the mixer 29 in the management table memory 33 to "busy". At the same time, the controller 32 turns on a switch which is located in the third column from the left and in the uppermost row in the cross-point switches 21, so as to connect the video camera 35 and the mixer 29. Furthermore, the controller 32 instructs the encoder 31 to send back a connection acceptance signal.

The connection acceptance signal is encoded by the encoder 31, and is then modulated by the modulator 30. The modulated signal is then sent onto the network 22 by the driver 28 via the mixer 29.

The connection request signal is decoded by all the multi-media terminal apparatuses connected to the network 22, and the controllers 32 of all the multi-media terminal apparatuses write "use of baseband channel started" in their management table memories 33.

Meanwhile, after sending the connection request signal at the multi-media terminal apparatus which requests the connection, the cross-point switches 21 are set so that a requested peripheral equipment (in this case, the video camera 35) of another multi-media terminal apparatus as a connection target is connected to a peripheral equipment (e.g., the display 36) and the LPF 27. When the display 36 and the LPF 27 are connected, a switch located in the first column from the left and in the third row from the uppermost row of the cross-point switches 21 is turned on, and the apparatus waits for a connection acceptance signal to be sent back.

When the connection acceptance signal is received, the display 36 of the multi-media terminal apparatus at the connection requesting side, and the video camera 35 of the multi-media terminal at the connection accepting side are connected to each other. Then image data sent from the video camera 35 using the baseband signal at the connection accepting side is received at the connection requesting side.

More specifically, the image data sent from the video camera 35 at the connection accepting side is supplied to the mixer 29 via the cross-point switches 21, and is mixed with a control signal. The mixed signal is sent onto the network 22 by the driver 28.

Meanwhile, the multi-media terminal apparatus at the connection requesting side causes the receiver 23 to receive the image data using the baseband signal sent from the connection accepting side via the network 22. The received data is sent to the display 40 via the LPF 27 and the cross-point switches 21, and is displayed on the display screen of the display 40.

Control commands such as enlargement and movement of a photographing range for the video camera 35 can be instructed and input from the mouse 46 or the keyboard 47. The instructed control signal is encoded by the encoder 31 via the sub CPU 44, the main CPU 42, and the controller 32, and is modulated to a 10 MHz control signal by the modulator 30. The modulated control signal is sent onto the network 22 via the mixer 29 and the driver 28 using a channel different from the channel for the image data.

This control signal is received by the receiver 23 of the multi-media terminal apparatus having the video camera, and is decoded by the decoder 26 via the HPF 24 and the demodulator 25. The decoded signal is supplied to the main CPU 42 via the controller 32. The main CPU 42 controls the video camera 35 via the I/F 39 in accordance with this control signal.

Thereafter, transmission operations of image data and various control signals are executed in parallel using different channels.

When a connection end signal is sent to a control signal channel, the controllers 32 of multi-media terminal apparatuses at the connection requesting and accepting side turn off the corresponding switches of cross-point switches 21, which have been turned on to connect the requested equipments, and rewrite the management table memories 33 to be "ready".

The connection end signal is also decoded in all other multi-media terminal apparatuses, and "end use of baseband channel" as a channel state is written in the corresponding management table memories 33.

Thereafter, each terminal apparatus waits for generation of connection request signals from other terminal apparatuses.

Figure 4:
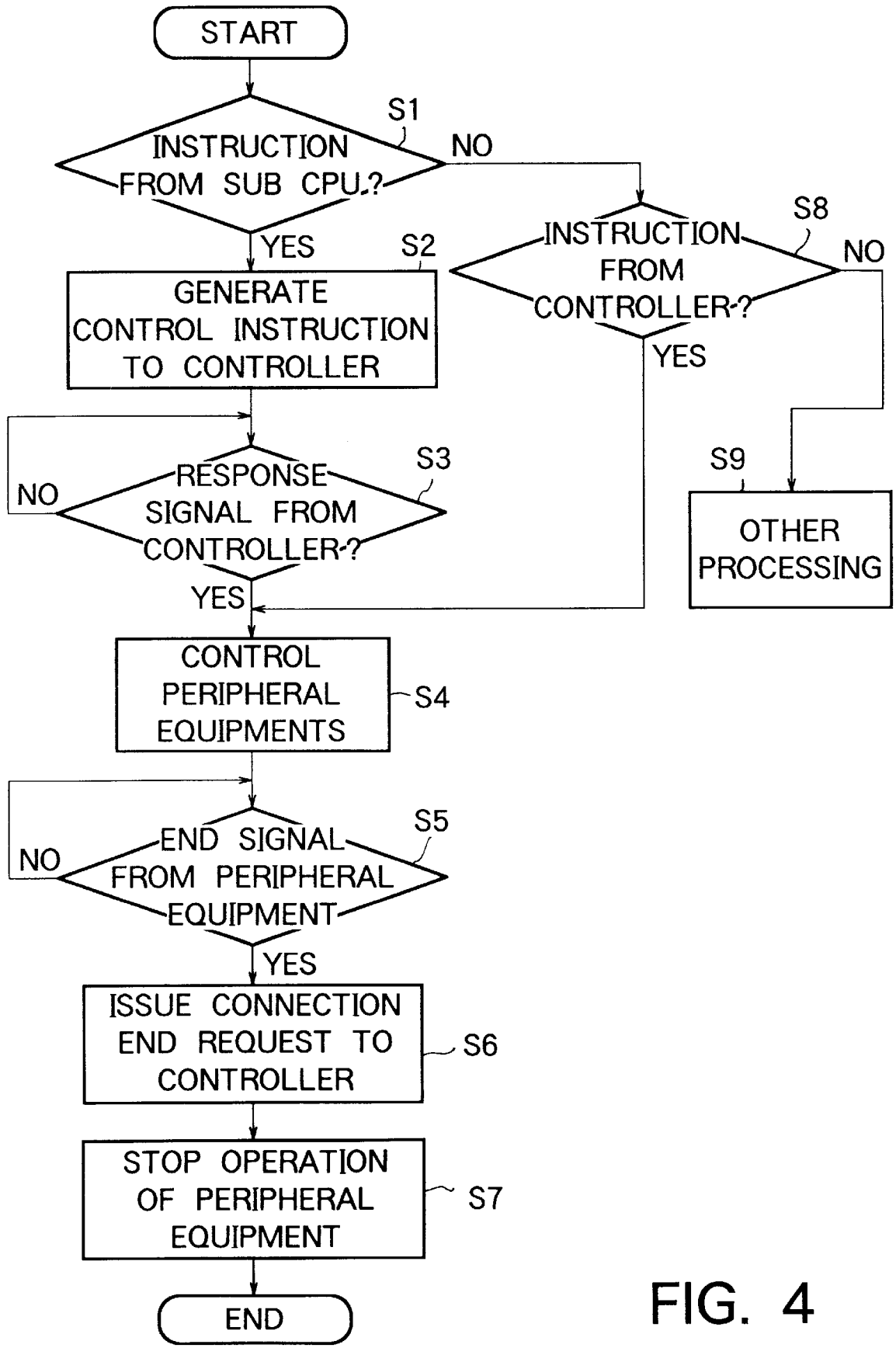
FIG. 4 is a flow chart showing a control sequence of a main CPU according to the embodiment shown in FIG. 1.

A control sequence of the main CPU 42 of the multi-media terminal apparatus according to this embodiment will be described below with reference to the flow chart shown in FIG. 4.

At step S1, the main CPU 42 of the multi-media terminal apparatus waits for operation instructions to peripheral equipments or other terminal apparatuses on the network 22 sent from the keyboard 47, and the like via the sub CPU 44. If the decision at step Si is YES, the main CPU 42 instructs the controller 32 to control, e.g., the cross-point switches 21 at step S2. At step S3, the main CPU 42 waits for a response signal indicating the completion of control of the cross-point switches 21 sent back from the controller 32. If there is a response signal from the controller 32, the main CPU 42 controls the peripheral equipment via a corresponding I/F corresponding to the operation instruction at step S4.

At step S5, the main CPU 42 waits for an operation end signal from the peripheral equipment which was the object of the operation instruction. If the operation end signal is sent, a YES decision is rendered at step S5, and the flow advances to step S6. At step S6, the main CPU 42 issues a request for ending connection control using the cross-point switches 21 to the controller 32. At step S7, the main CPU 42 sends a command to the peripheral equipment which issued the operation end signal, thereby causing the equipment to end its operation.

On the other hand, if the instruction detected at step S1 is not the one from the sub CPU 44, the flow advances to step S8 to check whether or not the instruction is supplied from the controller 32. If there is the instruction from the controller 32, the flow advances to step S4, and the CPU 42 controls the instructed peripheral equipment.

However, if there are no instructions from the sub CPU 44 or the controller 32, the flow advances to step S9 where other processing operations are executed.

DESCRIPTION OF OTHER EMBODIMENTS

Figure 5A:
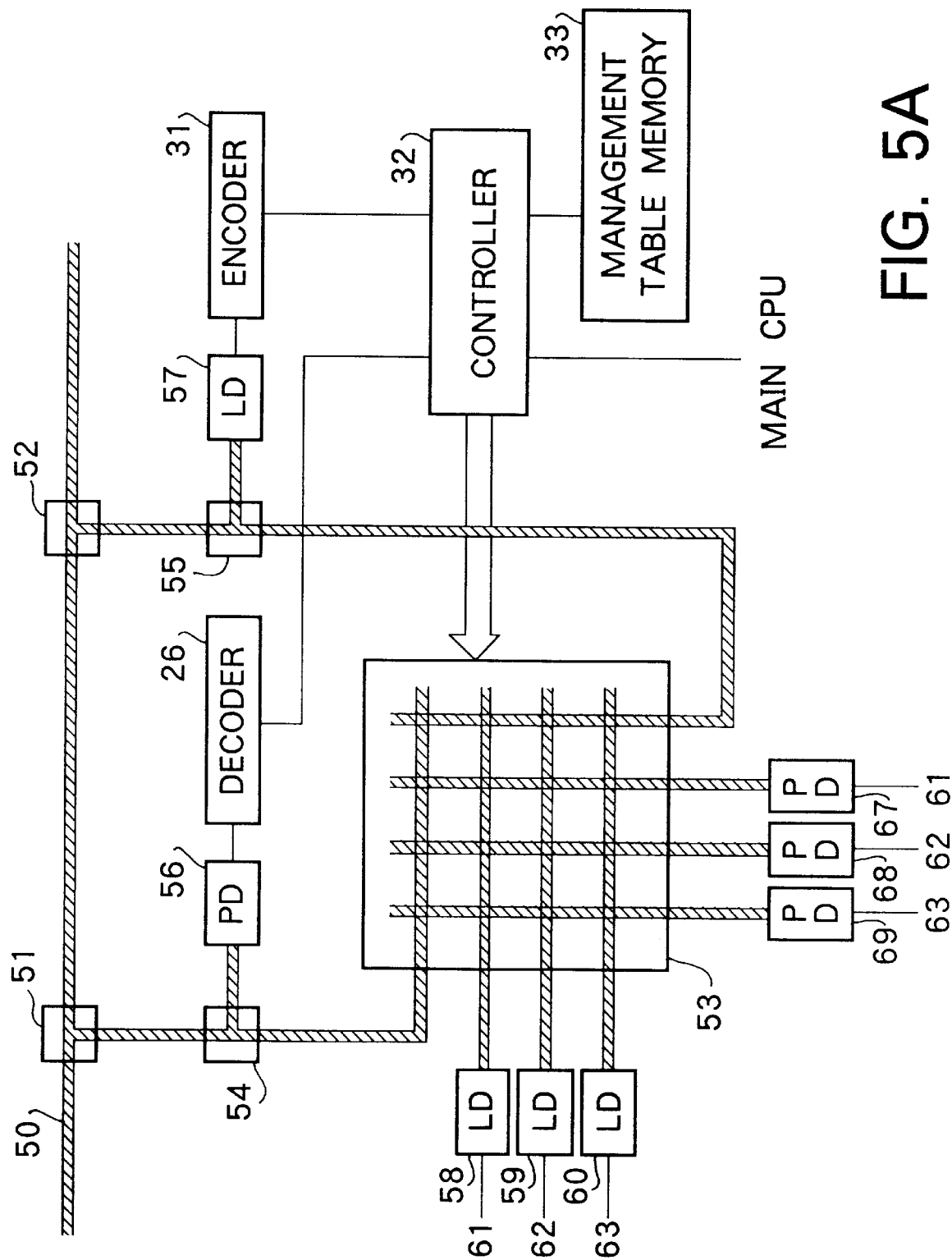
FIGS. 5A and 5B together form a block diagram showing a multi-media terminal apparatus according to another embodiment of the present invention.
Figure 5B:
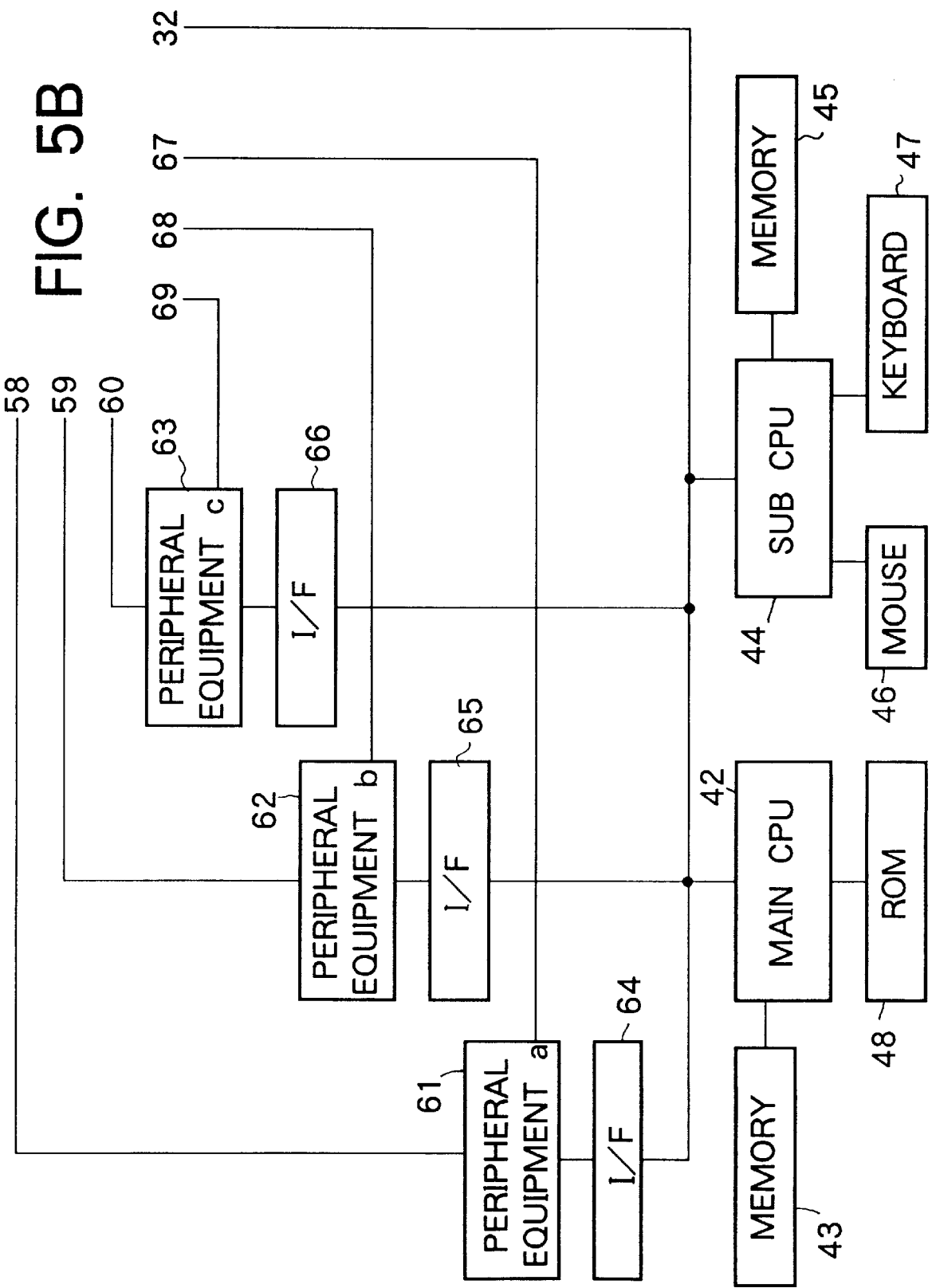
Figure 6:
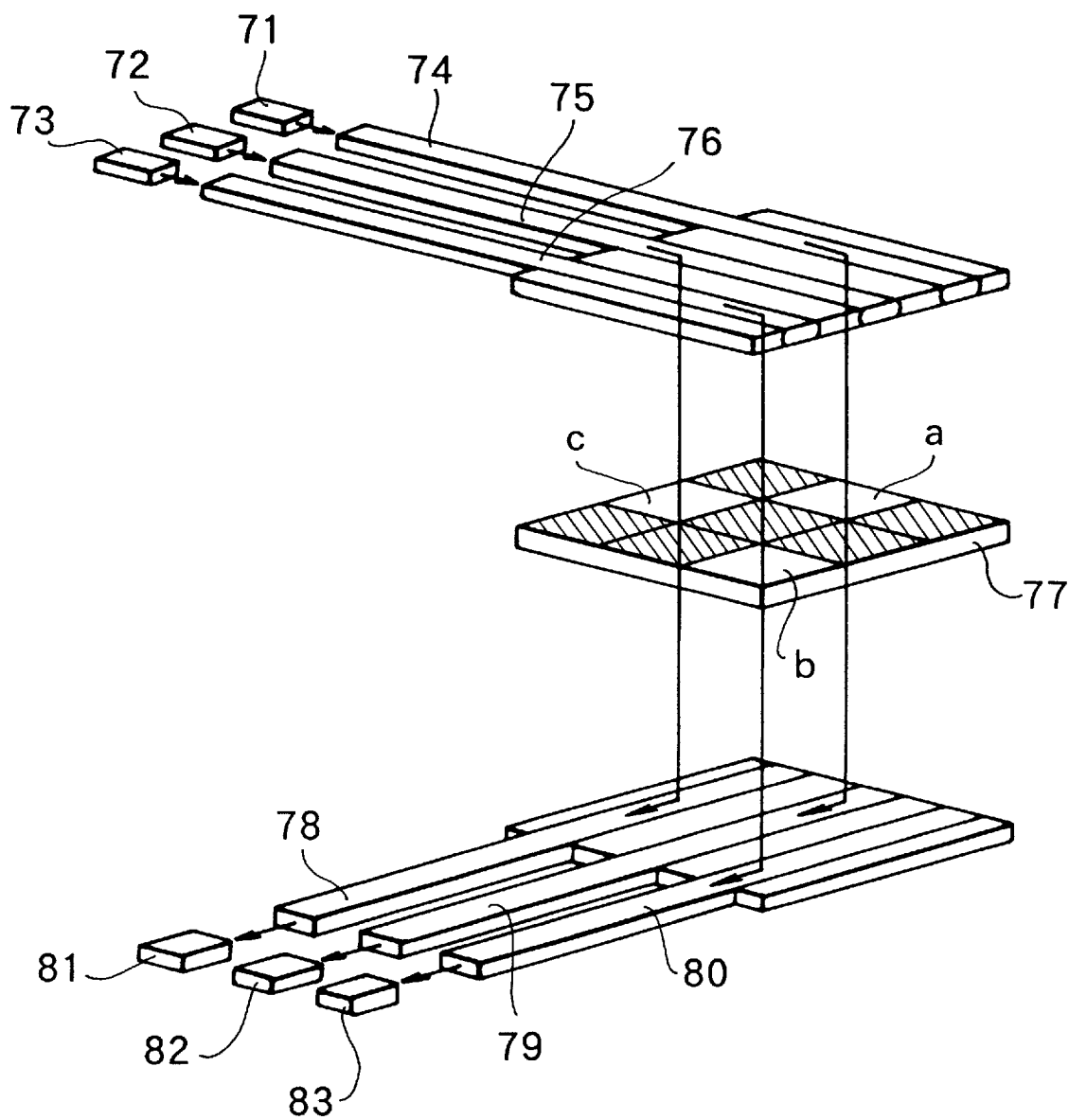
FIG. 6 is a perspective view-showing the principle of optical exchange switches according to the embodiment shown in FIGS. 5A and 5B and FIGS. 7 and 8 are diagrams showing connections among conventional multi-media terminal apparatuses and a network.
Figure 7:
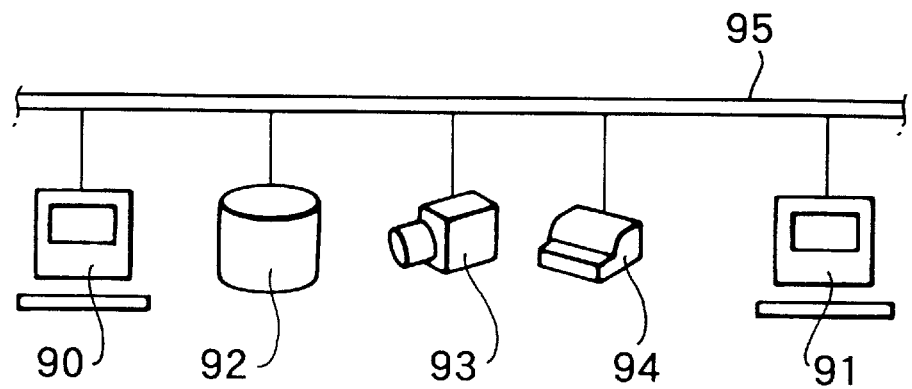
Figure 8:
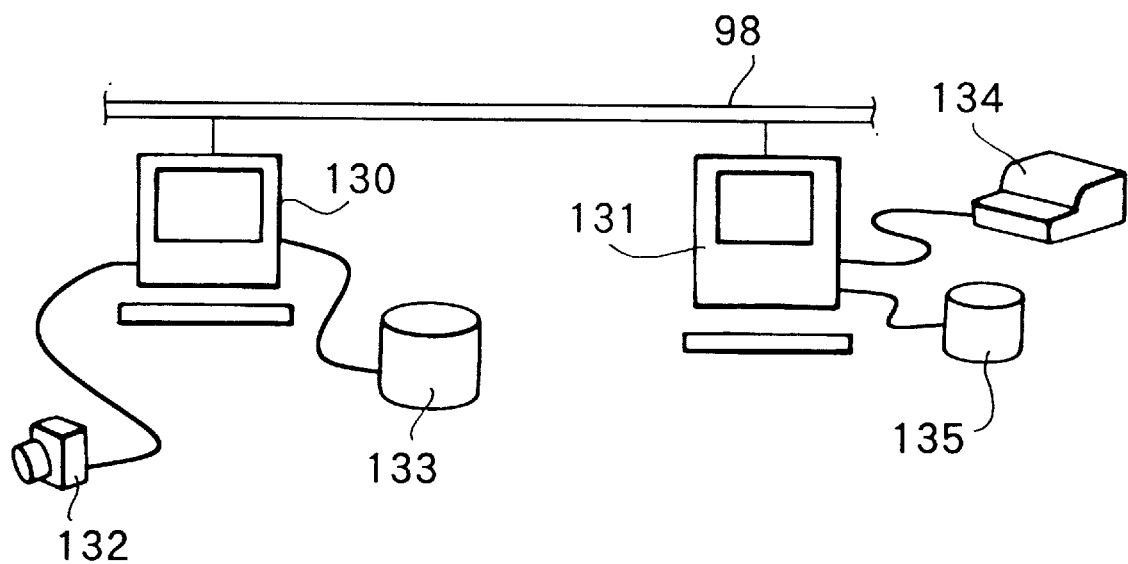

FIGS. 5A and 5B together form a block diagram of a multi-media terminal apparatus using optical signals according to another embodiment of the present invention. FIG. 6 is a perspective view for explaining an operation of optical exchange switches for exchanging optical signals.

The operation of the optical exchange switches according to this embodiment will be described below with reference to FIG. 6.

In FIG. 6, reference numerals 71 to 73 denote light-emitting elements such as LEDs or LDs, which have a function of converting an input electrical signal into an optical signal. Reference numerals 74 to 76 denote optical waveguides, which have a function of guiding an optical signal onto a shutter array 77. The shutter array 77 comprises liquid crystal optical switches, gallium arsenide (GaAs) optical switches, or the like, and has a function of selectively inputting optical signals from the optical waveguides 74 to 76 to optical waveguides 78 to 80 under the control of a drive circuit (not shown) which controls ON/OFF of the shutter. Reference numerals 81 to 83 denote light-receiving elements such as photodiodes, which have a function of converting a received optical signal into an electrical signal.

An optical signal emitted from the light-emitting element 71 is guided onto the shutter array 77 via the optical waveguide 74. The optical signal is incident on the optical waveguide 79 via an opening portion a, and is then detected by the light-receiving element 82. Similarly, optical signals from the light-emitting elements 72 and 73 are received by the light-receiving elements 81 and 83, respectively. Thus, the exchange function is determined by the corresponding combination of light-emitting elements and light-receiving elements, i.e., the exchange function is achieved by controlling opening portions of the shutter array 77.

The embodiment shown in FIGS. 5A and 5B employs a multi-wavelength optical fiber as a network.

In FIG. 5A, reference numeral 50 denotes a multi-wavelength optical fiber; and 51, an optical branching filter for extracting an optical signal from the network using the optical fiber 50. An optical branching filter 54 of wavelength selective type emerges the optical signal extracted by the filter 51 to a PIN type Ge photodiode (PD) 56 as a light having a wavelength of 0.83 $\mu$m which is an oscillation wavelength of an AlGaAs laser diode. The filter 54 also emerges the optical signal extracted by the filter 51 toward optical exchange switches 53 as a light having a wavelength of 1.30 $\mu$m which is an oscillation wavelength of an InGaAsP laser diode. The optical signal incident on the PD 56 is converted into an electrical signal, and the electrical signal is decoded by a decoder 26. Thus, various control contents are supplied to the controller 32.

The optical exchange switches 53 are used to exchange optical signals. An optical mixer 55 mixes an output optical signal from the optical exchange switches 53 and an optical signal from an AlGaAs laser diode (LD) 57, and sends the mixed signal to an optical mixer 52. The optical mixer 52 sends the mixed signal from the optical mixer 55 onto the optical fiber 50.

Reference numerals 58 to 60 denote InGaAsP laser diodes (LDs) for converting electrical signals into optical signals. These LDs respectively convert electrical signals from a peripheral equipment a 61, a peripheral equipment b 62, and a peripheral equipment c 63 into optical signals having a wavelength of 1.30 $\mu$m, and input these signals into the optical exchange switches 53. Reference numerals 67 to 69 denote PIN type Ge photodiodes (PDs) for converting optical signals from the optical exchange switches 53 into electrical signals. The electrical outputs of these PDs are connected to the peripheral equipment a 61, the peripheral equipment b 62, and the peripheral equipment c 63, respectively. Note that a controller 32, a main CPU 42, and others have the same arrangements and functions as those in the embodiment shown in FIG. 2.

The embodiment with the above arrangement will be described in detail below with reference to FIGS. 5A and 5B.

In FIG. 5A, the optical fiber 50 has two channels, i.e., a communication channel using a wavelength of 0.83 μm.associated with the AlGaAs laser diode, and a communication channel using a wavelength of 1.30 μm associated with the InGaAsP laser diode. The light having the wavelength of 0.83 μm is used for controlling optical exchange switches and various peripheral equipments, and is received by the PD 56 via the optical branching filters 51 and 54. The received optical signal is converted into an electrical signal, and the electrical signal is supplied to the decoder 26. The signal decoded by the decoder 26 is supplied to the controller 32, and the controller 32 instructs ON/OFF operations to desired switches of the optical exchange switches 53 in accordance with the decoded results.

Data from various peripheral equipments constituting other multi-media terminal apparatuses on the optical fiber 50 are transmitted as an optical signal having the wavelength of 1.30 μm associated with the InGaAsP laser diode to the optical exchange switches 53 via the optical branching filters 51 and 54. The optical exchange switches 53 are set in a switching connection state as instructed by the above-mentioned control. Thus, data from the various peripheral equipments of other multi-media terminal apparatuses are received by the PDs 67 to 69 corresponding to the target peripheral equipments, and are converted into corresponding electrical signals. These signals are input to the target peripheral equipments.

Connection requests to other multi-media terminal apparatuses are encoded by the encoder 31, and converted into optical signals having a wavelength of 0.83 μm by the LD 57. The optical signals are sent onto the optical fiber 50 via the mixers 55 and 52.

Connections among peripheral equipments equipped in a single multi-media terminal apparatus are instructed and input by an operator using the mouse 46 or the keyboard 47. The controller 32 performs ON/OFF control of the optical exchange switches in accordance with the input instructions. As a result, electrical signals from the peripheral equipments are converted into optical signals having a wavelength of 1.30 μm by the InGaAsP laser diodes, and these optical signals are switched to optical paths corresponding to the target peripheral equipments by the optical exchange switches 53. These optical signals are received by the PIN type Ge photodiodes, and are converted into electrical signals. The electrical signals are input to corresponding peripheral equipments.

As described above, according to the present invention, by arranging switches in each of a plurality of multi-media terminal apparatuses which are connected to a transmission line with a plurality of channels, even one of a plurality of peripheral equipments constituting a multi-media terminal apparatus is communicating with another terminal apparatus on the transmission line, other peripheral equipments of the multi-media terminal apparatus can be connected without going through the transmission line. Therefore, a waiting time for the transmission line can be eliminated. As a result, operating efficiency of peripheral equipments can be improved, and the peripheral equipments can be effectively utilized.

Since the peripheral equipments are directly connected to other multi-media terminal apparatuses via the transmission line, a load on each multi-media terminal apparatus for signal transmission of the peripheral equipments can be reduced, and a processing speed and efficiency of the terminal apparatus itself can be improved.

Furthermore, data transmission with peripheral equipments of other multi-media terminal apparatuses on the transmission line, and transmission of control signals are performed using different channels, therefore, even during data transmission, various conditions for peripheral equipments can be changed, and the end of transmission can be instructed.

When optical exchange switches are adopted to switch connections of peripheral equipments constituting a multi-media terminal apparatus connected to a transmission line using an optical fiber, the time required by connection switching can be greatly shortened, and a transmission bandwidth of transmission signals can be widened.

As many apparently widely different embodiments of the present invention can be made without departing from the spirit and scope thereof, it is to be understood that the invention is not limited to the specific embodiments thereof except as defined in the appended claims.

What is claimed is:

1. A method of connecting a predetermined terminal apparatus, adapted for connection to a network, and a plurality of peripheral equipment which are adapted for connection to the network through another terminal apparatus, comprising the steps of:

confirming, by using a memory in which usage states of the network are stored, whether the network is capable of being used;

generating a connection request signal that includes a signal designating at least one of the plurality of peripheral equipment;

sending the connection request signal to the network; and sending a control signal, adapted to the at least one designated peripheral equipment, to the network for controlling an operation of the at least one designated peripheral equipment independently of the other terminal.

2. The method according to claim 1, wherein the memory stores information identifying unoccupied channels of the network.

3. The method according to claim 1, wherein said generating step includes the step of providing the connection request signal as an encoded and modulated signal.

4. A method of connecting a predetermined terminal apparatus, adapted for connection to a network, and a plurality of peripheral equipment which are adapted for connection to the network through another terminal apparatus, comprising the steps of:

receiving a connection request signal via the network and interpreting the received connection request signal, the received connection request signal designating at least one of the plurality of peripheral equipment;

confirming, by using a memory in which usage states of the plurality of peripheral equipment are stored, a usage state of the at least one designated peripheral equipment;

rewriting the usage states in the memory in accordance with the connection request signal;

controlling a switch circuit that connects the at least one designated peripheral equipment to the network through the other terminal in accordance with the connection request signal;

generating a connection acceptance signal and sending the connection acceptance signal to the network; and receiving a control signal, adapted for the at least one designated peripheral equipment, for controlling an operation of the at least one designated peripheral equipment via the network independently of the other terminal.

5. The method according to claim 4, wherein the switch circuit includes a cross-point switch.

6. The method according to claim 4, wherein the cross-point switch includes an optical switch.

7. A method of controlling a connection to a network, using a management memory which stores usage states of a plurality of peripheral equipment adapted for connection to the network through a first terminal apparatus, comprising the steps of:

receiving a request signal sent from another terminal apparatus, the request signal indicating a request for using at least one of the plurality of peripheral equipment;

determining, by using the management memory, whether or not the at least one peripheral equipment is capable of being used to fulfill the request;

sending an acceptance signal to the network if it is determined at said determining step that the request can be fulfilled;

rewriting said management memory in accordance with the determination of said determining step; and receiving a control signal, adapted to the at least one peripheral equipment, for controlling an operation of the at least one peripheral equipment via the network independently of the first terminal apparatus.

8. The method according to claim 7, wherein the plurality of peripheral equipment includes a video camera, a scanner, an optical disk apparatus and a display apparatus.

* * * * *

UNITED STATES PATENT AND TRADEMARK OFFICE
CERTIFICATE OF CORRECTION

PATENT NO. : 5,848,240

DATED : December 8, 1998

INVENTOR(S): MITSURU YAMAMOTO

It is certified that error appears in the above-identified patent and that said Letters Patent is hereby corrected as shown below:

On the title page, item
[56] REFERENCES CITED

"(JP-A-129850)" should read --(JP-A-1298850)--.

COLUMN 2

Line 26, "ransmitted/received" should read
--transmitted/received--.

COLUMN 3

Line 9, "view-showing" should read --view showing--.
Line 11, "5B" should read --5B;--.

COLUMN 4

Line 13, "FIG. 2" should read --FIG. 2,--.
Line 17, "2B" should read --2B,--.

COLUMN 5

Line 67, "is-encoded" should read --is encoded--.

UNITED STATES PATENT AND TRADEMARK OFFICE
CERTIFICATE OF CORRECTION

PATENT NO.  : 5,848,240

DATED       : December 8, 1998

INVENTOR(S) : MITSURU YAMAMOTO

It is certified that error appears in the above-identified patent and that said Letters Patent is hereby corrected as shown below:

<u>COLUMN 7</u>

Line 40, "Si" should read --S1--.

Signed and Sealed this

Twelfth Day of October, 1999

Attest:

Q. TODD DICKINSON

*Attesting Officer*       *Acting Commissioner of Patents and Trademarks*